US009626018B2

(12) United States Patent
Christiansson et al.

(10) Patent No.: US 9,626,018 B2
(45) Date of Patent: Apr. 18, 2017

(54) OBJECT DETECTION IN TOUCH SYSTEMS

(71) Applicant: FlatFrog Laboratories AB, Lund (SE)

(72) Inventors: Tomas Christiansson, Torna-Hallestad (SE); Nicklas Ohlsson, Bunkeflostrand (SE); Andreas Björklund, Lund (SE); Mats Petter Wallander, Lund (SE)

(73) Assignee: FLATFROG LABORATORIES AB, Lund (SE)

( * ) Notice: Subject to any disclaimer, the term of this patent is extended or adjusted under 35 U.S.C. 154(b) by 109 days.

(21) Appl. No.: 14/398,235

(22) PCT Filed: Apr. 29, 2013

(86) PCT No.: PCT/SE2013/050474
§ 371 (c)(1),
(2) Date: Oct. 31, 2014

(87) PCT Pub. No.: WO2013/165306
PCT Pub. Date: Nov. 7, 2013

(65) Prior Publication Data
US 2015/0138105 A1    May 21, 2015

Related U.S. Application Data

(60) Provisional application No. 61/641,529, filed on May 2, 2012.

(30) Foreign Application Priority Data

May 2, 2012  (SE) ...................................... 1250434

(51) Int. Cl.
*G06F 3/041*     (2006.01)
*G06F 3/042*     (2006.01)

(52) U.S. Cl.
CPC ............. *G06F 3/041* (2013.01); *G06F 3/0416* (2013.01); *G06F 3/0421* (2013.01); *G06F 2203/04104* (2013.01); *G06F 2203/04109* (2013.01)

(58) Field of Classification Search
CPC .................. G06F 3/041; G06F 3/0416; G06F 2203/04109; G06F 2203/04104; G06F 3/0421
See application file for complete search history.

(56) References Cited

U.S. PATENT DOCUMENTS 6,972,753 B1   12/2005   Kimura et al.
7,432,893 B2   10/2008   Ma et al.
(Continued)

FOREIGN PATENT DOCUMENTS

WO   WO-2009048365        4/2009
WO   WO-2009077962 A2     6/2009
(Continued)

OTHER PUBLICATIONS

European Search Report and Written Opinion issued in Application No. 13784425.4 on Nov. 18, 2015.
(Continued)

*Primary Examiner* — Charles Hicks
(74) *Attorney, Agent, or Firm* — Harness, Dickey & Pierce, PLC

(57) ABSTRACT

A signal processor implements a technique for detecting objects on a panel which transmits signals inside the panel such that the objects are allowed to interact with (e.g. attenuate) the signals by contact with a touch surface of the panel. The signal processor operates to define cells that have a given location on the touch surface and are associated with a respective set of intersecting paths for the signals across the touch surface. The signal processor operates to obtain
(Continued)

(70) an output signal from a signal detection arrangement that measures a signal property for each path; process (71) the output signal to obtain an interaction value for each path; and determine (73-75) a touch status of a selected cell among the cells by analyzing the distribution of interaction values for at least part of the intersecting paths. The touch status indicates presence or absence of one of the objects in the selected cell.

18 Claims, 7 Drawing Sheets

(56) References Cited

U.S. PATENT DOCUMENTS

| | | | |
|---|---|---|---|
| 2004/0252091 A1* | 12/2004 | Ma | G06F 3/0421 345/87 |
| 2006/0114237 A1 | 6/2006 | Crockett et al. | |
| 2006/0170658 A1 | 8/2006 | Nakamura et al. | |
| 2007/0075648 A1 | 4/2007 | Blythe et al. | |
| 2009/0153519 A1* | 6/2009 | Suarez Rovere | G06F 3/0421 345/173 |

FOREIGN PATENT DOCUMENTS

| | | | |
|---|---|---|---|
| WO | WO-2010006882 A2 | 1/2010 |
| WO | WO-2010006883 A2 | 1/2010 |
| WO | WO-2010006884 A2 | 1/2010 |
| WO | WO-2010006885 A2 | 1/2010 |
| WO | WO-2010006886 A2 | 1/2010 |
| WO | WO-2010064983 A2 | 6/2010 |
| WO | WO-2010134865 A1 | 11/2010 |
| WO | WO-2011028169 A1 | 3/2011 |
| WO | WO-2011028170 A1 | 3/2011 |
| WO | WO-2011049511 A1 | 4/2011 |
| WO | WO-2011049512 A1 | 4/2011 |
| WO | WO-2011049513 A1 | 4/2011 |
| WO | WO-2011139213 A1 | 11/2011 |
| WO | WO-2012050510 A1 | 4/2012 |
| WO | WO-2012082055 A1 | 6/2012 |
| WO | WO-2012121652 A1 | 9/2012 |
| WO | WO-2013048312 A2 | 4/2013 |
| WO | WO-2013062471 A2 | 5/2013 |

OTHER PUBLICATIONS

International Preliminary Report on Patentability issued in International Application No. PCT/SE2013/050474 on Nov. 4, 2014.
International Search Report PCT/ISA/210 issued in International Application No. PCT/SE2013/050474 on Jun. 2, 2014.

* cited by examiner

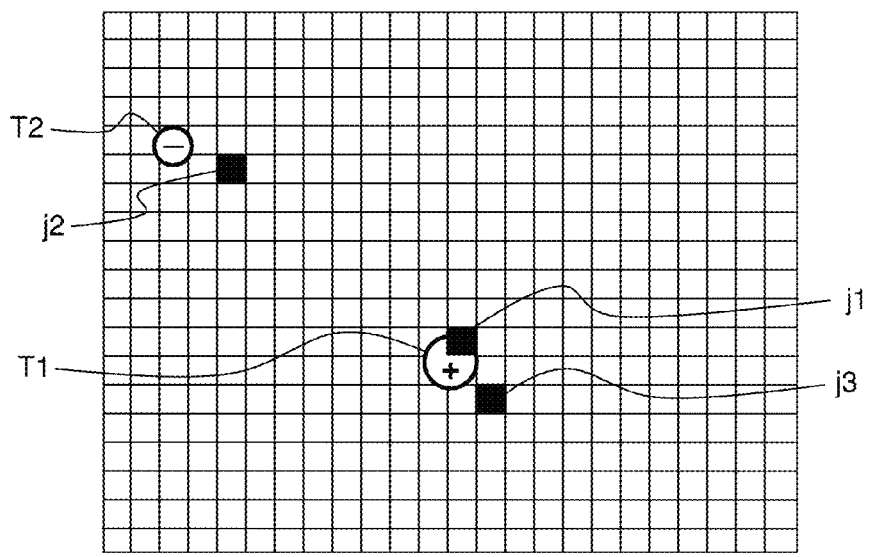
Fig. 3
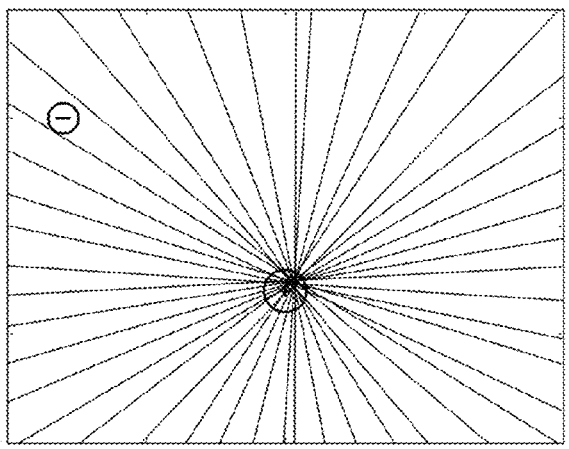
Fig. 4A
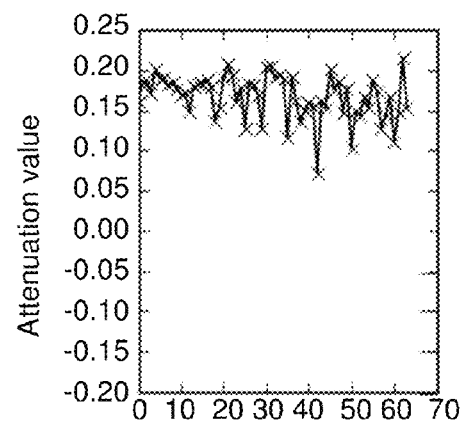
Fig. 5A  Detection line
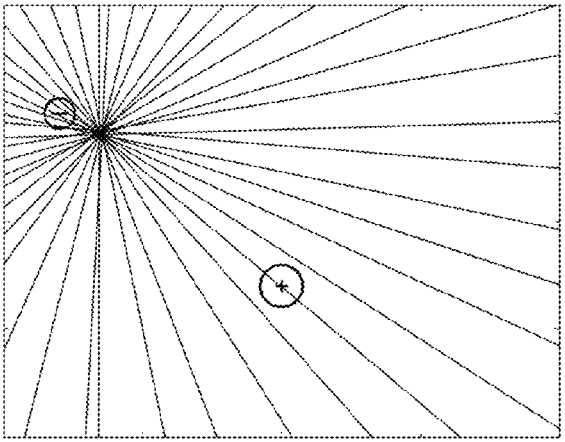
Fig. 4B
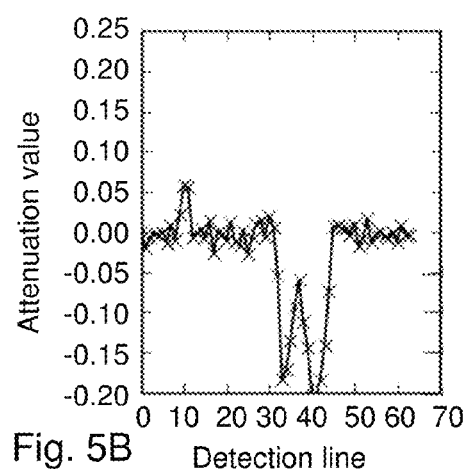
Fig. 5B  Detection line

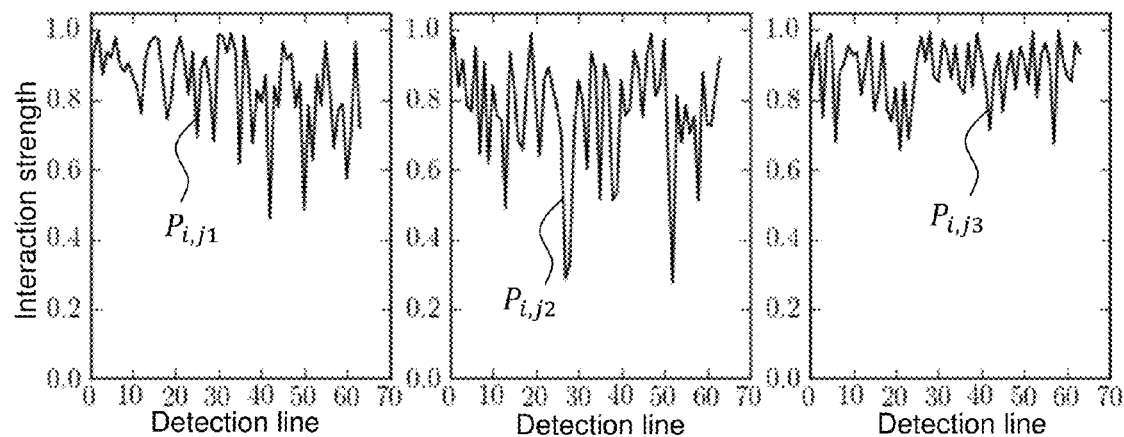
Fig. 9A    Fig. 9B    Fig. 9C
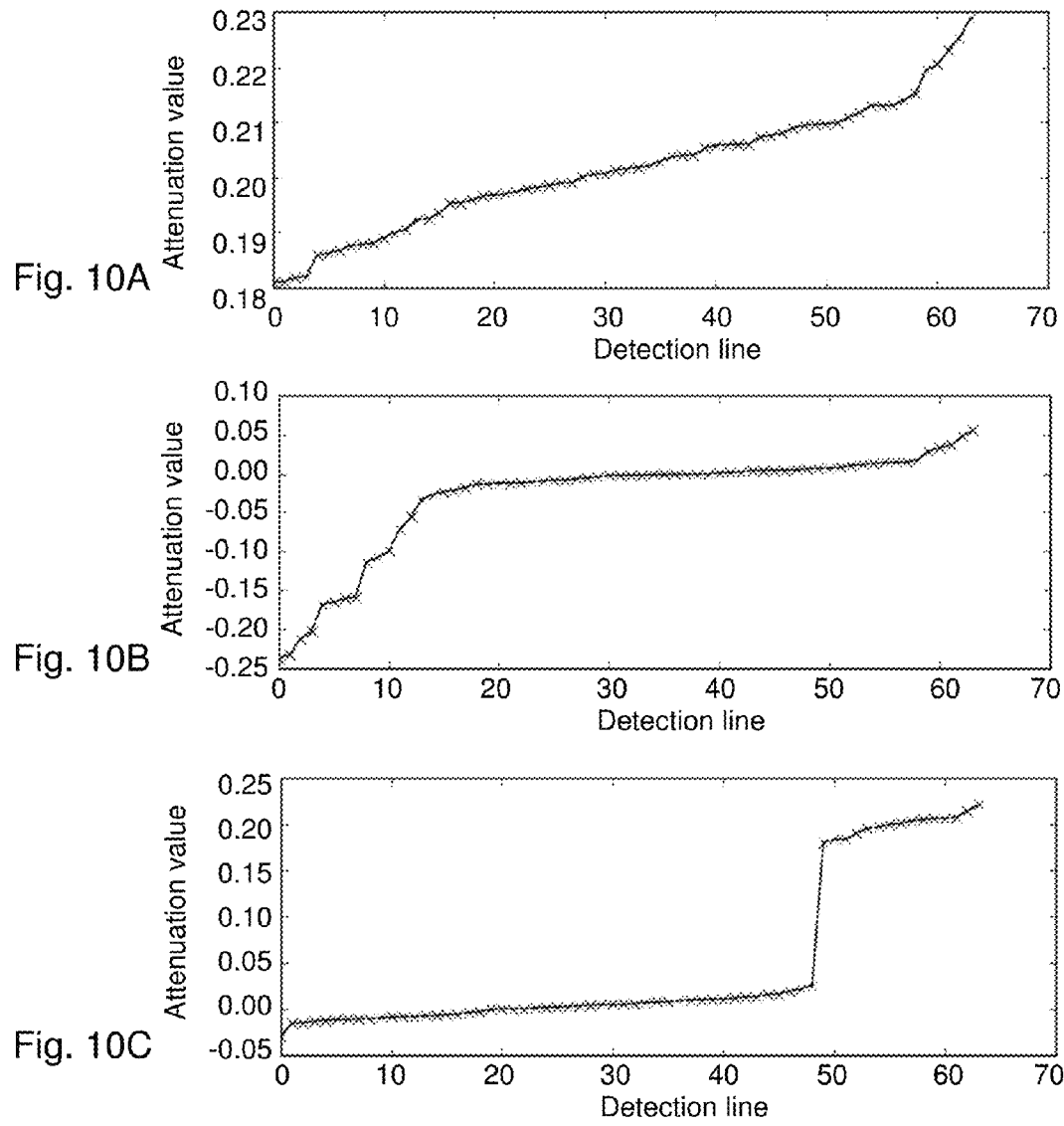
Fig. 10A
Fig. 10B
Fig. 10C

OBJECT DETECTION IN TOUCH SYSTEMS

CROSS-REFERENCE TO RELATED APPLICATIONS

The present application is the National Phase of International Application No. PCT/SE2013/050474, filed 29 Apr. 2013, which claims priority Swedish patent application No. 1250434-6, filed 2 May 2012, and U.S. provisional application No. 61/641,529, filed 2 May 2012, both of which are incorporated herein by reference.

TECHNICAL FIELD

The present invention relates to touch systems and data processing techniques in relation to such systems.

BACKGROUND ART

Touch sensing systems ("touch systems") are in widespread use in a variety of applications. Typically, the touch systems are actuated by a touching object such as a finger or stylus, either in direct contact or through proximity (i.e. without contact) with a touch surface. Touch systems are for example used as touch pads of laptop computers, in control panels, and as overlays to displays on e.g. hand held devices, such as mobile telephones. A touch system that is overlaid on or integrated in a display is also denoted a "touch screen". Many other applications are known in the art.

To an increasing extent, touch systems are designed to be able to detect two or more touches simultaneously, this capability often being referred to as "multi-touch" in the art. There are numerous known techniques for providing multi-touch sensitivity, e.g. by using cameras to capture light scattered off the point(s) of touch on a panel, or by incorporating resistive wire grids, capacitive sensors, strain gauges, etc into a panel.

US2004/0252091 discloses an alternative technique which is based on frustrated total internal reflection (FTIR). Diverging light sheets are coupled into a panel to propagate inside the panel by total internal reflection. When an object comes into contact with a surface of the panel, two or more light sheets will be locally attenuated at the point of touch. Arrays of light sensors are located around the perimeter of the panel to detect the received light for each light sheet. A coarse reconstruction of the light field across the panel surface is then created by geometrically back-tracing and triangulating all attenuations observed in the received light. This is stated to result in data regarding the position and size of each contact area.

US2009/0153519 discloses a panel capable of conducting signals on a plurality of signal paths. A "tomograph" is positioned adjacent the panel with signal flow ports arrayed around the border of the panel at discrete locations. Signal values measured at the signal flow ports for the different signal paths are arranged in a sinogram (b) and tomographically processed to generate a representation (x) of the conductivity on the panel in a grid of pixels, whereby touching objects on the panel surface can be detected. The presented technique for tomographic reconstruction is based on a linear model of the tomographic system, Ax=b. The system matrix A is calculated at factory, and its pseudo inverse $A^{-1}$ is calculated using Truncated SVD algorithms and operated on the sinogram b of measured signal values to yield the conductivity for the grid of pixels: $x=A^{-1}b$. Thereby, the conductivity of each pixel is given by a linear combination of the measured signal values. US2009/0153519 also mentions that the signal values of certain signal paths may be discarded or not measured at all, e.g. signal values for signal paths that are too short or known to produce weak signals.

The technique presented in US2009/0153519 is merely a straight-forward implementation of well-known tomographic algorithms for reconstructing an image of a cross-section through an attenuating medium based on projection measurements through the attenuating medium. Many tomographic algorithms are known in the art, e.g. Filtered Back Projection (FBP), FFT-based algorithms, ART (Algebraic Reconstruction Technique), SART (Simultaneous Algebraic Reconstruction Technique), etc. On a general level, the tomographic algorithms apply a back projection or inversion function on the projection measurements to produce reconstruction values that represent the attenuating medium. The inversion function may operate in either the spatial domain or the Fourier domain to provide a solution to a linear system of equations. Generally, in all of the above-mentioned tomographic algorithms, the inversion function is designed to generate the reconstruction value of a pixel in the image as a linear combination of the projection measurements through this pixel, as well as at least part of the projection measurements through other pixels. For further details, reference is made to "The Mathematics of Computerized Tomography", by F Natterer, 2001, Chapter V: "Reconstruction algorithms".

Conventionally, tomographic algorithms are designed for medical imaging purposes and operate on a large number of projection measurements at specific angles to the attenuating medium, where the projection measurements are produced by a rotating measurement system. Touch systems, on the other hand, have a fixed measurement system (cf. the above-mentioned signal ports) which produces a limited number of projection measurements at signal paths that are generally mismatched to the tomographic algorithms. This may introduce reconstruction errors into the resulting image and make it difficult to properly detect touching objects. Reconstruction errors may e.g. make it difficult to detect weakly interacting objects in presence of strongly interacting objects, or to separately detect objects in proximity to each other on the touch surface.

In addition, touch systems typically need to operate to generate the image in real time and at high repetition rate, e.g. 10-100 Hz.

There is thus a general need to develop improved techniques for detecting objects on a touch surface based on projection measurements through a signal conducting panel.

SUMMARY

It is an objective of the invention to at least partly overcome one or more limitations of the prior art.

Another objective is to provide a technique that enables touch detection irrespective of the arrangement of the projection measurements across the touch surface.

Yet another objective is to provide a touch detection technique that enables touch detection in real time.

One or more of these objectives, as well as further objectives that may appear from the description below, are at least partly achieved by means of a method, a computer-readable medium, a device and a touch-sensitive apparatus according to the independent claims, embodiments thereof being defined by the dependent claims.

A first aspect of the invention is a method of detecting objects on a panel, which is configured to transmit signals inside the panel such that the objects are allowed to interact with the signals by contact with a touch surface of the panel. The method comprises the steps of: defining a plurality of reconstruction cells with respect to the touch surface, each reconstruction cell having a given location on the touch surface and being intersected by a respective set of transmission paths for the signals across the touch surface; obtaining an output signal from a signal detection arrangement which is configured to measure a signal property for each transmission path; processing the output signal to obtain an interaction value for each transmission path; and determining a touch status of a selected reconstruction cell among the reconstruction cells by analyzing the distribution of interaction values for transmission paths that intersect the selected reconstruction cell, wherein the touch status indicates presence or absence of one of the objects in the selected reconstruction cell.

The first aspect is based on the insight that the objects generally produce isolated areas of interaction on the touch surface, and that a major part of the touch surface is unaffected by objects. Thereby, the touch status of a selected cell on the touch surface may be determined by simply analyzing the interaction values for the transmission paths that intersect a selected cell on the touch surface. Generally, each interaction value is generated to represent a change in interaction with respect to a reference value for the respective transmission path.

Thus, the method of the first aspect allows the touch status to be determined directly from the transmission paths that intersect the individual cells. As used herein, a transmission path is deemed to intersect a cell when at least portion of the transmission path extends through the cell. By way of the first aspect, it is possible to dispense with tomographic processing and also eliminate the reconstruction errors that are inherent to such processing. The first aspect is thus a direct method, which does not involve finding a solution to a linear system of equations, and may be implemented as a processing-efficient process on a signal processor. Since the touch status is given by analysis of the distribution of interaction values, the method does not require a particular layout of the transmission paths across the touch surface. The analysis of the distribution of interaction values also provides an improved ability of detecting weak touches in the presence of strong touches on the touch surface. It should also be noted that the method of the first aspect may be used in combination with advanced image reconstruction processing, e.g. to validate cells within regions with reconstruction errors.

In one embodiment, the distribution of interaction values is analyzed in relation to a predefined interaction value that represents either absence or presence of interaction with an object along the respective transmission path. For example, the touch status may determined by the degree of clustering of interaction values at the predefined interaction value.

In one embodiment, the step of determining the touch status comprises identifying, based on the interaction values, at least one of interacting and non-interacting transmission paths among the transmission paths that intersect the selected reconstruction cell, and determining the touch status as a function of a count of said at least one of interacting and non-interacting transmission paths.

In one embodiment, the interacting and non-interacting transmission paths are deemed to intersect and not intersect, respectively, one or more of the objects on the touch surface.

In one embodiment, the touch status is determined based on a ratio given by the count. For example, the ratio may relate the count to the number of transmission paths that intersect the selected reconstruction cell.

In one embodiment, the step of identifying at least one of the interacting and the non-interacting transmission paths comprises: mapping the interaction values for the transmission paths that intersect the selected reconstruction cell to a specific range of interaction values. For example, the specific range may be set to include a predefined interaction value that represents either presence or absence of interaction with an object along the respective transmission path.

In one embodiment, the step of identifying at least one of the interacting and the non-interacting transmission paths comprises: processing the interaction values for detection of one or more clusters of interaction values of corresponding magnitude, and determining said count based on said one or more clusters. For example, the clusters may be detected after the interaction values have been sorted by magnitude.

In one embodiment, the count is given by a count of interaction values in a cluster that includes an interaction value that represents either a presence or an absence of interaction with an object along the respective transmission path.

In one embodiment, the method further comprises a step of normalizing, before the step of determining the touch status, the interaction values for the set of transmission paths that intersect the selected reconstruction cell, by a respective intersection value which corresponds to a relative overlap between the respective transmission path and the selected reconstruction cell.

In one embodiment, the step of determining the touch status is performed for a plurality of selected reconstruction cells within a region of interest on the touch surface.

In one embodiment, the method further comprises a step of generating a two-dimensional distribution of reconstruction values representative of interaction on the touch surface by operating an image reconstruction algorithm on the interaction values for at least part of the transmission paths, and processing the two-dimensional distribution for identification of the region of interest. The region of interest may be identified in the two-dimensional distribution to contain at least one object. For example, the region of interest may be a coherent region of reconstruction values that all indicate presence of an object.

In a specific embodiment, the method further comprises a step of determining a peak reconstruction value within the region of interest in the two-dimensional distribution, and setting the above-mentioned specific range in relation to the peak reconstruction value.

In one embodiment, the method further comprises steps of: estimating a location of the objects on the touch surface; and selecting, based on the estimated location of the objects and for the selected reconstruction cell, a subset of the set of transmission paths that intersect the selected reconstruction cell, wherein the subset is selected to exclude the transmission paths that geometrically intersect the estimated location of at least one of the objects, and wherein the touch status is determined by analyzing the distribution of interaction values for the subset of transmission paths.

In one embodiment, the signal detection arrangement is configured to measure energy of light that has propagated along the transmission paths inside the panel by internal reflections between a front surface and an opposing surface of the panel, wherein the front surface defines the touch surface and allows the light to be attenuated by interaction with the objects.

A second aspect of the invention is a computer-readable medium comprising computer code which, when executed on a data-processing system, is adapted to carry out the method of the first aspect.

A third aspect of the invention is a device for detecting objects on a panel, which is configured to transmit signals inside the panel such that the objects are allowed to interact with the signals by contact with a touch surface of the panel. The device comprises: means for defining a plurality of reconstruction cells with respect to the touch surface, each reconstruction cell having a given location on the touch surface and being intersected by a respective set of transmission paths for the signals across the touch surface; means for obtaining an output signal from a signal detection arrangement which is configured to measure a signal property for each transmission path; means for processing the output signal to obtain an interaction value for each transmission path; and means for determining a touch status of a selected reconstruction cell among the reconstruction cells by analyzing the distribution of interaction values for transmission paths that intersect the selected reconstruction cell, wherein the touch status indicates presence or absence of an object in the selected reconstruction cell.

A fourth aspect of the invention is a touch-sensitive apparatus. The apparatus comprises: a panel configured to conduct signals from a plurality of peripheral incoupling points to a plurality of peripheral outcoupling points, thereby defining transmission paths that extend across a touch surface on the panel between pairs of incoupling and outcoupling points; means for generating the signals at the incoupling points; a signal detection arrangement for generating an output signal based on detected signals at the outcoupling points; and the device according to the third aspect.

Any one of the above-identified embodiments of the first aspect may be adapted and implemented as an embodiment of the second to fourth aspects.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

FIG. 3 is a top plan view of a reconstruction grid defined on a touch surface with two touches.

FIGS. 4A-4C are top plan views that illustrate detection lines that intersect a respective cell in FIG. 3.

FIGS. 5A-5C are plots of attenuation values for the respective set of detection lines in FIGS. 4A-4C.

FIGS. 9A-9C are plots of computed interaction strengths for the respective set of detection lines in FIGS. 4Aa-4C.

FIGS. 10A-10C are plots of the attenuation values in FIGS. 5A-5C sorted by magnitude after normalization by interaction strength.

DETAILED DESCRIPTION OF EXAMPLE EMBODIMENTS

Figure 1:
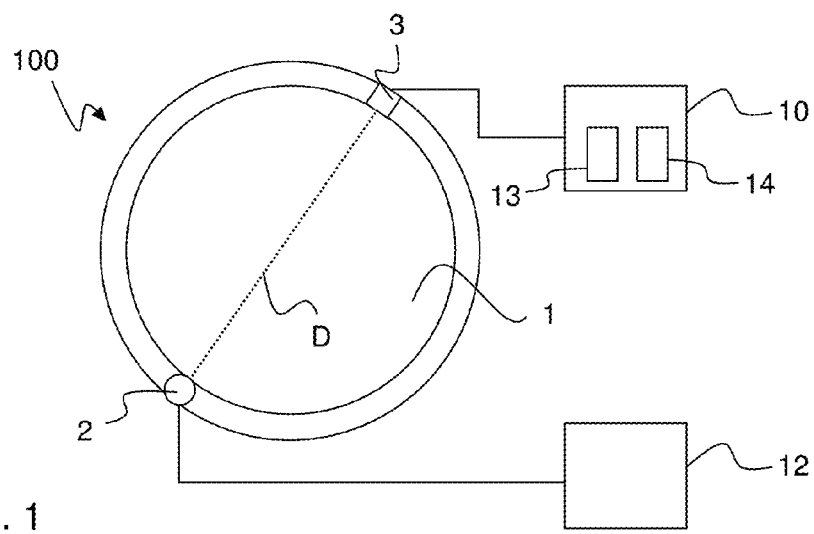
FIG. 1 is a top plan view of a touch-sensitive apparatus.

Below follows a description of example embodiments of a technique for detecting objects in contact with a touch surface of a touch-sensitive apparatus. Throughout the following description, the same reference numerals are used to identify corresponding elements.

1. Touch-Sensitive Apparatus

FIG. 1 illustrates a touch-sensitive apparatus 100 which is based on the concept of transmitting signals of some form inside a panel across a touch surface 1, such that an object that is brought into close vicinity of, or in contact with, the touch surface 1 causes a change in a property of the transmitted signal. The touch-sensitive apparatus 100 includes an arrangement of emitters and sensors, which are distributed along the periphery of the touch surface. Each pair of an emitter and a sensor defines a "detection line", which corresponds to the propagation or transmission path for an emitted signal from the emitter to the sensor. In FIG. 1, only one such detection line D is illustrated to extend from emitter 2 to sensor 3, although it should be understood that the arrangement typically defines a more or less dense grid of detection lines, each corresponding to a signal being emitted by an emitter and detected by a sensor. Any object that touches the touch surface along the extent of the detection line D may thus change the signal property measured by the sensor 3.

The arrangement of sensors (detectors) is electrically connected to a signal processor 10, which samples and processes an output signal from the arrangement. The output signal contains a number of sub-signals, also denoted "projection signals", each representing a property of the signal emitted by a certain emitter 2 and received by a certain detector 3. Depending on implementation, the signal processor 10 may need to process the output signal for separation of the individual projection signals. The output signal may e.g. be indicative of the received energy (or an equivalent parameter, such as power or intensity) at each sensor 3. As will be explained below, the signal processor 10 may be configured to repeatedly process the output signal for detection of objects on the touch surface 1. The signal processor may e.g. extract a position (e.g. x, y coordinates), a shape or an area of each object. In the following, a "frame" denotes a repeated event starting with data collection and ending with detection of touches for the collected data.

The objects on the touch surface 1 may include control objects that engage the touch surface under active and deliberate control by a user for the purpose of producing an action. These control objects generate "touches" on the touch surface 1. The objects on the touch surface 1 may also include unintended objects that end up on the touch surface 1 without any intention of producing an action, but rather constitute an interference to the detection of touches. These unintended objects are collectively referred to as "contaminations" and include fingerprints, grease, spills, smear and other deposits. As will be described below, the projection signals may be processed to suppress or essentially eliminate the influence of contaminations, leaving only touches to be detected on the touch surface 1.

In the example of FIG. 1, the apparatus 100 also includes a controller 12 which is connected to selectively control the activation of the emitters 2 and, possibly, the readout of data from the sensors 3. The signal processor 10 and the controller 12 may be configured as separate units, or they may be incorporated in a single unit. As indicated, the signal processor 10 may include a processing unit 13 that operates in association with an electronic memory 14.

The apparatus 100 may be configured to permit transmission of signals in one of many different forms. The emitted signals may thus be any radiation or wave energy that can travel in and across the touch surface 1 including, without limitation, light waves in the visible or infrared or ultraviolet spectral regions, electrical energy, electromagnetic energy, magnetic energy, sonic energy, ultrasonic energy and vibration energy.

Figure 2A:
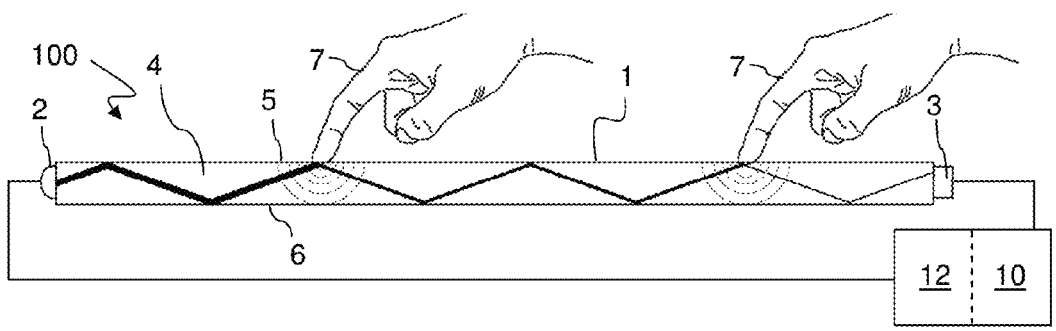
FIGS. 2A-2B are side and top plan views of a touch-sensitive apparatus operating by frustrated total internal reflection (FTIR).
Figure 2B:
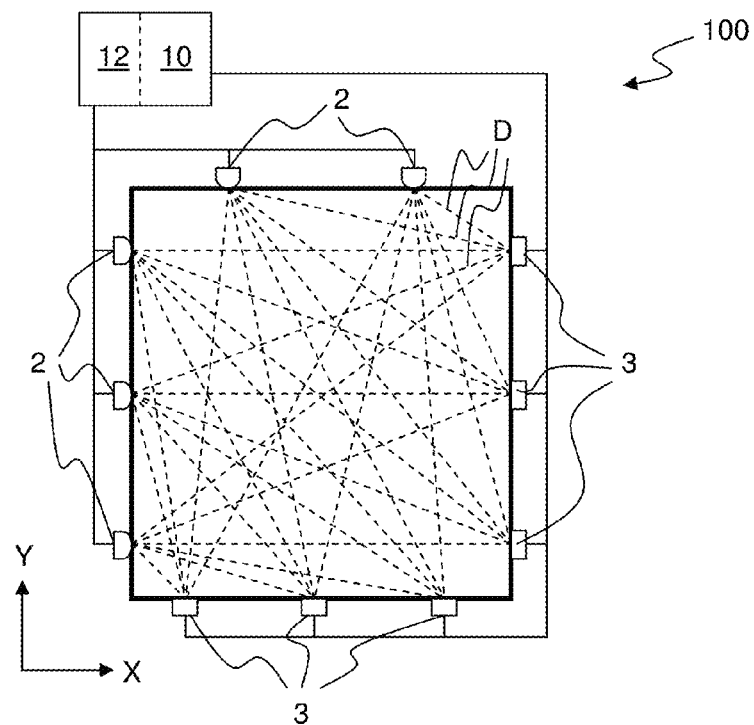

Embodiments of the invention may, e.g., be applied in an apparatus 100 that operates by frustrated total internal reflection (FTIR), as described in the Background section. FIGS. 2A-2B illustrate an example of such an "FTIR system", in which emitters 2 and sensors 3 are placed along the periphery of a light transmissive panel 4, which defines the surface 1. The panel 4 is made of solid material in one or more layers and may have any shape. The panel 4 defines an internal radiation propagation channel, in which light propagates by internal reflections. In the example of FIG. 2A, the propagation channel is defined between the boundary surfaces 5, 6 of the panel 4, where the top surface 5 allows the propagating light to interact with touching objects 7 and thereby defines the touch surface 1. This is achieved by injecting the light into the panel 4 such that the light is reflected by total internal reflection (TIR) in the touch surface 1 as it propagates through the panel 4. The light may be reflected by TIR in the bottom surface 6 or against a reflective coating thereon. It is also conceivable that the propagation channel is spaced from the bottom surface 6, e.g. if the panel comprises multiple layers of different materials.

The apparatus 100 allows an object 7 that is brought in contact with the touch surface 1 to interact with the propagating light at the point of touch. In this interaction, part of the light may be scattered by the object 7, part of the light may be absorbed by the object 7, and part of the light may continue to propagate in its original direction across the panel 1. Thus, the object 7 causes a local frustration of the total internal reflection, which leads to a decrease in the energy/power/intensity of the transmitted light, as indicated by the thinned lines downstream of the objects 7 in FIG. 2A.

Light generated by the emitters 2 is coupled into the panel 1 at a plurality of incoupling points (ports), propagates by TIR inside the panel 4, and is detected by the sensors 3 at plurality of outcoupling points (ports). In the example of FIG. 2B, light is coupled into the panel 1 in the shape of a beam or wave that diverges in the plane of the touch surface 1, and the sensors 3 are arranged to receive light over a wide range of angles (field of view). Thus, light propagation paths are defined between the emitters 2 and the sensors 3. Each of the light propagation paths, as projected onto the touch surface 1, forms a respective detection line D in a grid of detection lines D across the touch surface 1, as shown in FIG. 2B.

FIGS. 2A-2B are merely given as an example of an FTIR system. Further examples of FTIR systems are e.g. disclosed in U.S. Pat. No. 6,972,753, U.S. Pat. No. 7,432,893, US2006/0114237, US2007/0075648, WO2009/048365, WO2010/006882, WO2010/006883, WO2010/006884, WO2010/006885, WO2010/006886, WO2010/064983, and WO2010/134865, which are all incorporated herein by this reference. The inventive technique is applicable to all types of FTIR systems.

2. Data Formatting

As noted in the foregoing, the signal processor 10 operates in a sequence of frames. In each frame, a projection value representing measured energy/power/intensity is determined for each projection signal, i.e. for each detection line D. In the following examples, it is presumed that the projection values are converted into an "attenuation value" for each detection line. The attenuation value for the k:th detection line $D_k$ is given by: $\overline{\alpha_k} = -\log(I_k/REF_k)$, or equivalently $\overline{\alpha_k} = \log(REF_k) - \log(I_k)$, where $I_k$ is the projection value for detection line $D_k$, and $REF_k$ is a reference value for detection line $D_k$. This format may be understood by considering that the transmission along a detection line $D_k$ may be represented as: $T_k = I_k/REF_k = e^{-\int a(x,y)dl}$, where $a(x,y)$ is the distribution of attenuation on the touch surface. Thereby, $\overline{\alpha_k}$ represents an aggregation of the attenuation along the detection line: $\overline{\alpha_k} = -\log(T_k) = \int a(x,y)dl$. It is understood that a "logarithm" is intended to also encompass functions approximating a true logarithmic function, in any base.

As will be explained below, the attenuation value may be seen to represent a change in attenuation on the detection line on a time scale given by the reference value $REF_k$.

In a first embodiment, further discussed in WO2010/064983, WO2011/049512, and WO2012/121652, the reference values are given by the projection signals at a certain calibration time point when no touching object (finger, stylus, etc) is present on the touch surface, such as when the assembly of the apparatus 100 is finalized, at start-up, or when a user initiates a reset operation of the apparatus 100. These reference values may be stored in memory 14. In this embodiment, the attenuation values are non-negative and represent the total accumulated attenuation on the individual detection lines since the calibration time point. To the extent that contaminations on the touch surface cause a detectable attenuation, the reference values may be intermittently updated to include the influence of such contaminations, e.g. as suggested in WO2010/064983 or WO2012/121652. Thereby, the attenuation values mainly represent the total accumulated attenuation caused by touches on the touch surface, and an attenuation value close to zero corresponds to an absence of touches on the detection line. The format of attenuation values generated by the first embodiment is generally referred to as "accumulated format" herein. For attenuation values in the accumulated format, a touch is represented as a positive attenuation change in one or more reconstruction cells.

In a second embodiment, disclosed in WO2013/048312 and WO2013/055282, the reference values are repeatedly set equal to the projection values at a given time interval $\Delta t$. The attenuation values at time t are thus given by: $\overline{\alpha_t} = -\log(I_t/I_{t-\Delta t}) = \log(I_{t-\Delta t}) - \log(I_t)$, wherein $I_t$ are the projection values at time t and $I_{t-\Delta t}$ the projection values at time $t-\Delta t$. Thereby, the attenuation values represent the change in attenuation on each detection line during $\Delta t$. The time interval $\Delta t$ may be set depending on implementation and may range from 1 frame to several frames. It is understood that the attenuation values extend from negative values to positive values, where negative attenuation values indicate a decrease in attenuation, e.g. caused by removal of an object during $\Delta t$, and positive attenuation values indicate an increase in attenuation, e.g. caused by addition of an object during $\Delta t$. Attenuation values in this format may improve detection of fast moving touches compared to touches that move slowly or not at all on the touch surface, while also reducing the impact of contaminations on the touch surface.

In a variation of the second embodiment, the reference values are updated to factor in projection values from more than one time point. For example, the reference values may be given by a temporally low-pass filtered projection value $\overline{I_{t-m}}$, e.g. $\overline{\alpha_t}=\log(\overline{I_{t-m}})-\log(I_t)$, where $\overline{I_{t-m}}$ or $\log(\overline{I_{t-m}})$ may be computed using any temporal low-pass filter. One such example is an exponential forget filter, such as: $\overline{I_{t-m}}=\overline{I_{t-m-1}}\pm\epsilon\cdot(I_{t-m}-\overline{I_{t-m-1}})$, or $\log(\overline{I_{t-m}})=\log(\overline{I_{t-m-1}})\pm\epsilon\cdot(\log(I_{t-m})-\log(\overline{I_{t-m-1}}))$, where $0<\epsilon\leq1$. It is also possible to compute $\overline{I_{t-m}}$ or $\log(\overline{I_{t-m}})$ using a moving average, etc. In all of these examples, m denotes frames and may have any suitable number, including 0.

The format of attenuation values generated by the second embodiment is generally referred to as "differential format" herein. It is to be noted that a moving control object will be represented by both positive and negative attenuation values in the differential format. Thus, for attenuation values in the differential format, a touch may be represented as either a positive or a negative attenuation change in one or more reconstruction cells.

3. Data Processing

In embodiments of the invention, the attenuation values are processed for detection of touches in a grid of reconstruction cells, which are mapped to the touch surface. An example of a grid of reconstruction cells is shown in FIG. 3. The cells may have any shape, size and distribution on the touch surface, but each cell is defined to have a known location and extent on the touch surface.

The inventive touch detection technique is based on the insight that touches generally appear as isolated areas of changed attenuation on the touch surface, and that a major part of the touch surface is unaffected by touches. As will be explained in the following, with reference to three cells j1-j3 in FIG. 3, it is possible to assess if a cell contains a touch by analyzing the attenuation values of the detection lines that intersect the reconstruction cell.

The following examples are given for attenuation values in the differential format, where the attenuation values are representative of a touch T1 represented by positive attenuation values ("positive touch") and a touch T2 represented by negative attenuation values ("negative touch") on the touch surface during the time interval Δt, as indicated in FIG. 3.

FIG. 4A illustrates detection lines that intersect the cell j1, which contains the positive touch T1, and FIG. 5A is a plot of the attenuation values of the intersecting detection lines. In FIG. 5A, the attenuation values are ordered according to the angular succession of detection lines in FIG. 4A. As seen, all detection lines have a positive attenuation value.

FIG. 4B illustrates detection lines that intersect the cell j2, which is located near but separate from the negative touch T2, and FIG. 5B is a plot of angularly ordered attenuation values for the intersecting detection lines in FIG. 4B. As seen, a majority of the detection lines have an attenuation value close to zero, while a small set of detection lines that intersect the positive touch T1 have positive attenuation values and a larger set of detection lines that intersect the negative touch T2 have negative attenuation values.

Figure 4C:
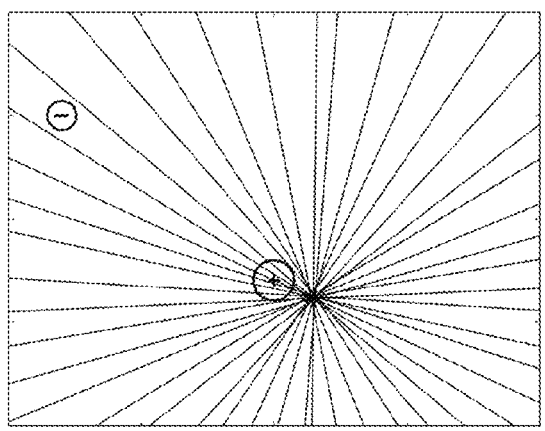
Figure 5C:
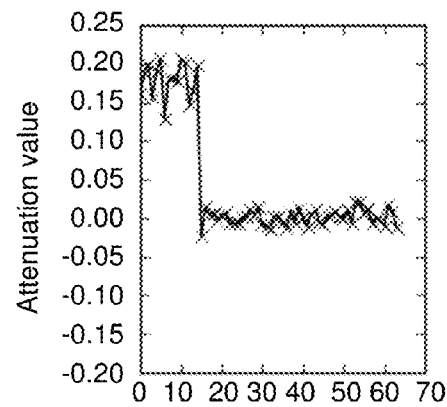

FIG. 4C illustrates detection lines that intersect the cell j3, which is located near but separate from the positive touch T1, and FIG. 5C is a plot of angularly ordered attenuation values for the intersecting detection lines in FIG. 4C. As seen, a majority of the detection lines have an attenuation value close to zero, while a relatively large set of detection lines that intersect the positive touch T1 have positive attenuation values.

It should be emphasized that even if the detection lines D are illustrated as thin lines in all drawings herein, they may actually be bands with a finite width in the plane of the touch surface 1.

FIGS. 5A-5C indicate that the distribution of attenuation values for the detection lines that intersect a given cell contains information about the presence or absence of a touch in the cell. The differences in distribution between different cells j1-j3 are further illustrated in FIGS. 6A-6C which are plots of the attenuation values in FIGS. 5A-5C, respectively, sorted by magnitude. Accordingly, embodiments of the invention operate to analyze the distribution of attenuation values for the intersecting detection lines for the purpose of determining a likely touch status of the cell, i.e. whether the cell contains a touch or not. The inventive technique provides several advantages over known techniques for touch detection. First, the touch status may be determined directly from the attenuation values for the intersecting detection lines. Thus, the inventive technique makes it possible to dispense with tomographic processing and thereby also eliminate the reconstruction errors that are inherent to such processing. Second, compared to tomographic techniques, the inventive technique is not optimized for a specific arrangement of the detection lines across the touch surface. Third, the inventive technique allows weak touches to be detected in the presence of strong touches on the touch surface. Furthermore, as will be described further below, the inventive technique may easily be adapted to improve such detection of weak touches. Fourth, the inventive technique may be used to validate cells within certain regions of interest (ROI) on the touch surface. For example, as described further below, the inventive technique may be combined with conventional image reconstruction (e.g. tomography) to validate certain regions in a 2D map of attenuation values produced by the image reconstruction. The regions may be defined based on the 2D map, e.g. for the purpose of searching for weak touches outside strong touches in the 2D map, to search for touches in regions deemed to contain reconstruction errors, or to verify if a region contains more than one touch.

Figure 7:
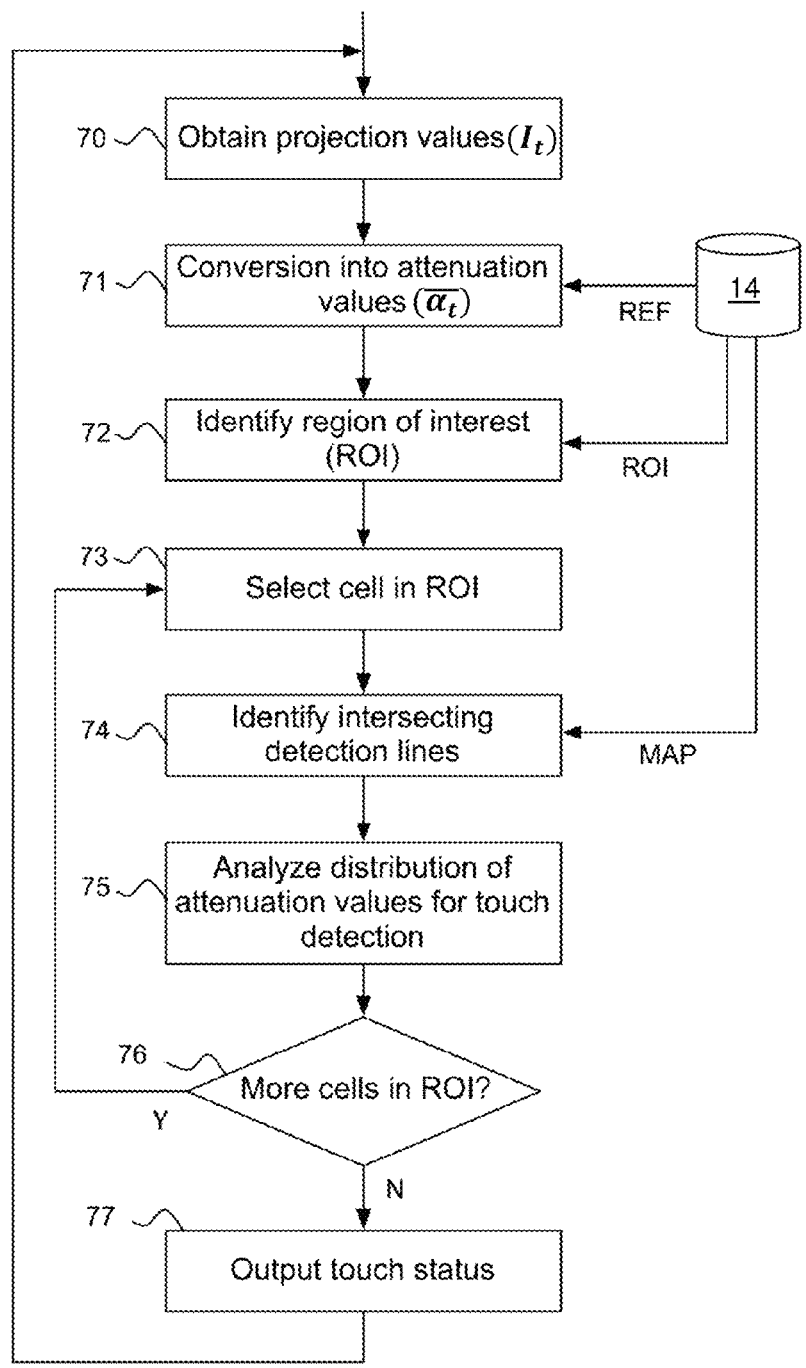
FIG. 7 is a flow chart of a touch detection method according to an embodiment of the invention.

FIG. 7 is a flow chart of an exemplifying method that implements the inventive technique for touch detection in a touch-sensitive apparatus, such as the above-described FTIR system. The method involves a sequence of steps 70-77 that are repeatedly executed, typically by the signal processor 10 (FIGS. 1-2). In the context of this description, each sequence of steps 70-77 constitutes a "frame" or "repetition".

Each frame starts by a data collection step 70, in which measurement values are obtained from the light sensors 3 in the FTIR system, typically by sampling a value from each of the aforesaid projection signals. The data collection step 70 results in one projection value for each detection line. The projection values collected in the current frame are collectively denoted by $I_t$. It may be noted that the data may, but need not, be collected for all available detection lines in the FTIR system. The data collection step 70 may also include pre-processing of the measurement values, e.g. filtering for noise reduction.

In a conversion step 71, the projection values $I_t$ are processed for generation of attenuation values in either the accumulated format or the differential format, depending on implementation. Step 71 may involve retrieval of appropriate reference values, indicated by REF in FIG. 7. The reference values may be retrieved, as indicated, from the memory 14, or from another process executed by the signal processor 10.

In step 72, at least one region of interest (ROI) is identified for the current frame. The ROI indicates the cells that are to be processed for touch detection. The ROI may be retrieved from the memory 14 or from another process executed by the signal processor 10. The determination of the ROI will be further exemplified below with reference to FIGS. 11 and 13. In certain implementations, step 72 may be omitted, e.g. if the ROI is the same for all frames and set to indicate the entire surface or one or more subareas.

The process then proceeds to repeat steps 73-76 for all cells in the ROI. In step 73, a cell in the ROI is selected. In step 74, the detection lines that intersect the selected cell are identified, e.g. based on a predefined cell-to-detection line mapping, which is retrieved from memory 14. The mapping, indicated by MAP in FIG. 7, may directly or indirectly associate each cell with a set of intersecting detection lines. Alternatively, the mapping may be computed on the fly. In step 75, the attenuation values for the intersecting detection lines are analyzed for determination of the touch status of the selected cell. If there are further cells in the ROI, step 76 returns to step 73. Otherwise, step 77 outputs the touch status for the cells in the ROI.

It is to be understood that FIG. 7 is merely given as an example and that one or more of the indicated steps may be modified or omitted. In one variant, the touch status is output already during step 75. In another variant, step 75 does not directly result in a touch status for the selected cell but in an intermediate value (e.g. the fractional count f, see below) which is processed downstream for determination of the touch status, e.g. after step 76. Furthermore, one or more of the indicated steps may be executed in parallel. For example, the data collection step 70 of a subsequent frame may be initiated concurrently with any one of the steps 71-77.

Although not shown in FIG. 7, it is understood that the process may include an initial step of defining the reconstruction grid to be used. The reconstruction grid may e.g. be defined by data retrieved from memory 14. Alternatively, the reconstruction grid may be inherently defined in steps 73-76.

The skilled person realizes that there are many approaches for implementing the analysis in step 75. Two exemplifying approaches, denoted "fractional analysis approach" and "cluster analysis approach", will be described below. In both of these exemplifying approaches, the distribution of attenuation values is analyzed in relation to zero attenuation, which known to represent an absence of interaction along the intersecting detection lines. Both approaches may be seen to determine the likely touch status of the selected cell by the degree of clustering of attenuation values at zero attenuation. In the fractional analysis approach, the degree of clustering may be estimated by counting the number of attenuation values that fall within (or outside) a limited range at zero attenuation. In the cluster analysis approach, the attenuation values are first processed by cluster analysis to identify any clusters of attenuation values (i.e. a group of attenuation values with similar or corresponding magnitude), whereupon the touch status may be determined based on the number of attenuation values included in the respective cluster and/or the location of the respective cluster with respect to zero attenuation. Both approaches may be seen to involve a step of identifying, among the intersecting detection lines, a set of non-interacting detection lines (that have attenuation values sufficiently close to zero) and/or a set of interacting detection lines (that have attenuation values sufficiently different from zero), and a step of determining the touch status as a function of a count of the non-interacting detection lines and/or a count of the interacting detection lines.

In other variants of the foregoing approaches, the touch status of the selected cell is determined by the degree of clustering of attenuation values at an attenuation value that is known to represent a presence of interaction on the intersecting detection lines, rather an absence of interaction (zero attenuation).

3.1 Fractional Analysis Approach

Figure 6A:
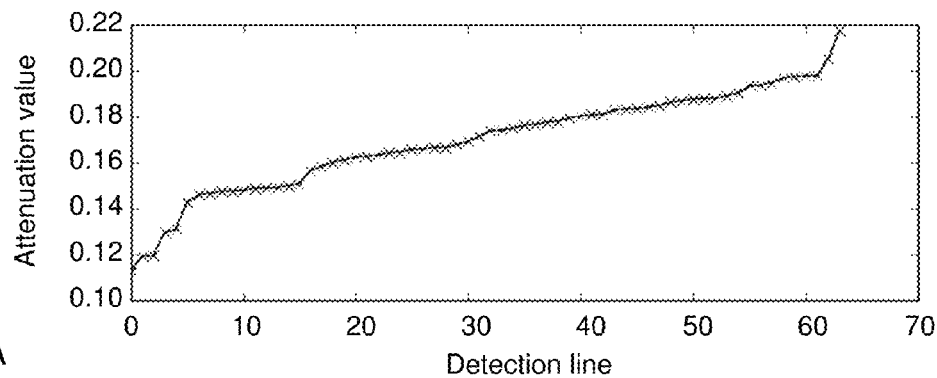
FIGS. 6A-6C are plots of the attenuation values in FIGS. 5A-5C sorted by magnitude.
Figure 6B:
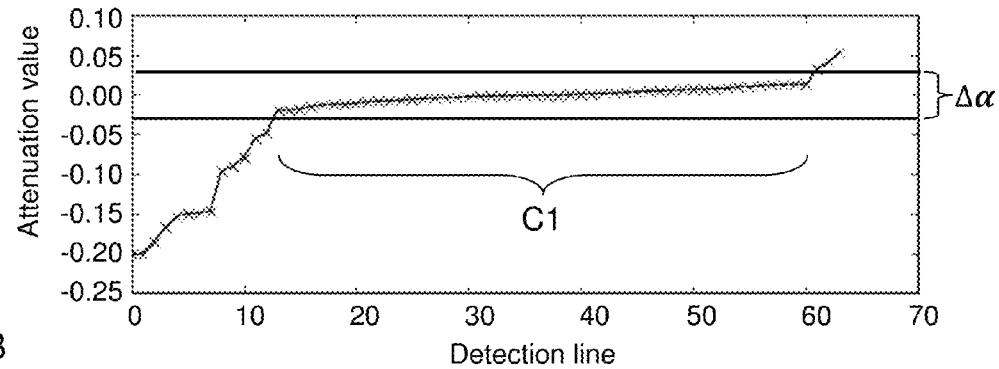
Figure 6C:
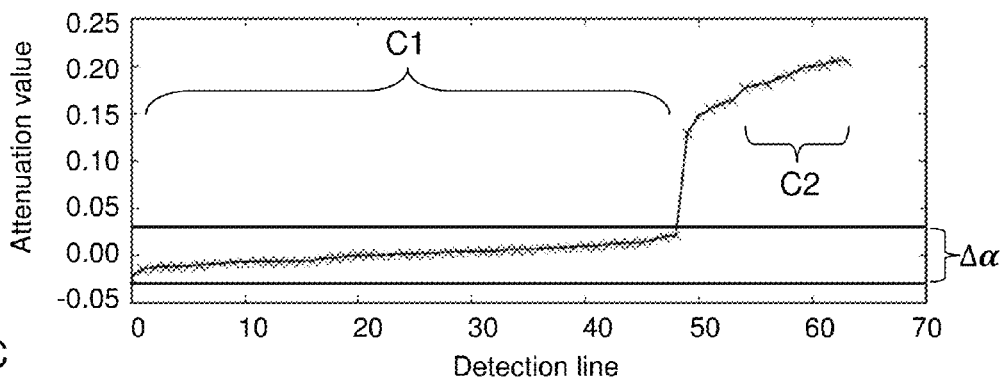

In one embodiment of the fractional analysis approach, the attenuation values of the intersecting detection lines are analyzed for identification of detection lines that are attenuated. For example, the attenuation values may be mapped to given range which is defined to include zero attenuation. If the attenuation value fall outside the range, the detection line is classified as attenuated. The extent of the range depends on implementation and may be selected to achieve desired a robustness or sensitivity in the touch detection, e.g. to suppress the influence of measurement noise. In the example of FIGS. 6B-6C, the range is indicated by $\Delta\alpha$ and set to extend from −0.03 to 0.03.

The touch status of the cell is then determined by comparing the number $N_a$ of attenuated detection lines to the total number $N_{tot}$ of intersecting detection lines for the selected cell. For example, a fractional count may be generated for the selected cell: $f=N_a/N_{tot}$. If the fractional count f exceeds a threshold, i.e. if a sufficient number of the intersecting detection lines are attenuated, the cell is deemed to contain a touch, otherwise not. The data in FIGS. 6A-6C yields f=1 for cell j1 (FIG. 6A), f=0.34 for cell j2 (FIG. 6B) and f=0.25 for cell j3 (FIG. 6C). An exemplifying threshold of 0.75 would thus indicate a touch in cell j1 and no touch in cells j2 and j3, which is correct (cf. FIG. 3). The value of the threshold depends on implementation.

The fractional analysis approach may be understood by looking at FIGS. 4A-4C. When the cell contains a touch (FIG. 4A) a majority of the intersecting detection lines will be attenuated. When there is no touch in the cell (FIG. 4B or FIG. 4C), a proportionally smaller number of intersecting detection lines will be attenuated.

If the attenuation values are generated in the differential format, it may also be desirable to determine if a touch is positive or negative. This may be done by a majority vote of the sign among the attenuated detection lines. For example, the attenuation values in FIG. 6A indicates a positive touch in cell j1.

In other embodiments of the fractional analysis approach, non-attenuated detection lines are identified, and the fractional count is generated based on the number of non-attenuated detection lines $N_{na}$, e.g. according to $f=N_{na}/N_{tot}$ or $f=N_a/N_{na}$. The non-attenuated detection lines may be identified based on the attenuation values that fall within the range $\Delta\alpha$ or a different range.

In yet further embodiments, the touch status of the cell is determined based on an absolute count rather than a fractional count, e.g. $N_a$ or $N_{na}$. Such an embodiment may e.g. be used if all cells have approximately the same number of intersecting detection lines.

3.2 Cluster Analysis Approach

In one embodiment of the cluster analysis approach, the attenuation values of the intersecting detection lines are processed by a clustering algorithm for identification of the most likely touch status of the cell. The clustering algorithm identifies clusters of similar attenuation values among the intersecting detection lines. If required by the clustering algorithm, the attenuation values may be sorted or otherwise arranged as a histogram (cf. FIGS. 6A-6C) before being input to the clustering algorithm.

In one example, the cell may be deemed not to contain a touch whenever the clustering algorithm identifies a sufficiently large cluster of zero or nearly zero attenuation ("zero cluster") Like in the fractional analysis approach, the touch status may be determined based on a fractional size of the zero cluster, e.g. the relation between the number of attenuation values in the zero cluster to the total number of intersecting detection lines. Alternatively, the touch status may be determined based on the absolute size of the zero cluster.

For example, FIG. 6B indicates a first cluster C1 which is a zero cluster of sufficient size to indicate absence of a touch in cell j2. In FIG. 6C, the clustering algorithm identifies two clusters C1 and C2. Since the cluster C1 is a zero cluster of sufficient size, absence of a touch in cell j3 is concluded.

If the clustering algorithm fails to identify a zero cluster, or if the zero cluster is too small, or if the clustering algorithm fails to identify any cluster, the cell may be deemed to contain a touch. In the example of FIG. 6A, the clustering algorithm will fail to identify a zero cluster, and presence a touch in cell j1 is concluded.

Alternatively, if the attenuation values are given in the accumulated format such that only positive touches exist, absence of a zero cluster may cause the touch status to be determined by comparing the minimum attenuation value of the largest cluster to a threshold or range. If the attenuation values are given in the differential format such that both positive and negative touches may exist, absence of a zero cluster may cause the touch status to be determined by comparing the average or the median of the largest cluster to the threshold/range. Irrespective of format, the threshold/range may be set globally or locally.

In the specific situation that the clustering algorithm identifies two main clusters of approximately the same size, i.e. a mainly bi-modal distribution of attenuation values, the touch status may be determined by comparing the average or median of the clusters to the threshold/range (if both positive and negative touches can exist), or by comparing the minimum attenuation value in the clusters to the threshold/range (if only positive touches can exist).

Like in the fractional analysis approach, the touch status may instead be determined based on a fractional size of one or more clusters of attenuated detection lines or based on the absolute size of such cluster(s).

There are many clustering algorithms that may be used for identifying clusters of attenuation values, i.e. groups of data points with almost the same value, including hierarchical algorithms, centroid-based algorithms (including k-means and k-medians clustering), distribution-based clustering and density-based clustering. Clusters may also be identified using well-known algorithms for removing outliers in a data set, such as RANSAC (Random Sampled Consensus) algorithms.

4. Improvements and Extensions

In one variation, step 74 in FIG. 7 may also involve a sub-step of normalizing the attenuation values for the intersecting detection lines. The normalization is thus made upstream of the analysis step 75 and aims at reducing differences in "interaction strength" between the different intersecting detection lines. The interaction strength is a measure of how much each detection line is affected by a uniform attenuation in the selected reconstruction cell. The interaction strength is thus given per intersecting detection line for each selected reconstruction cell, and is denoted by $P_{i,j}$ with j representing the reconstruction cell and i representing the intersecting detection lines. The interaction strength $P_{i,j}$ may be pre-computed to represent the overlap between the intersecting detection line and the reconstruction cell, e.g. given by a line integral between the detection line and the reconstruction cell. The line integral may or may not account for a width of the detection line, and possibly an intensity profile in the width direction. The interaction strength $P_{i,j}$ is also denoted "intersection value", since it represents the relative overlap between the respective detection line and the reconstruction cell.

Figure 8:
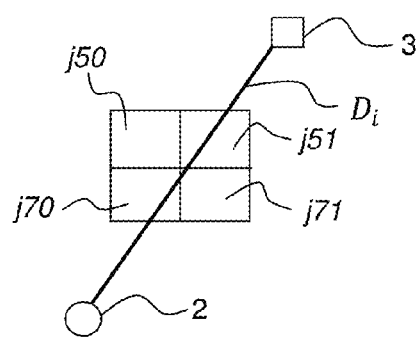
FIG. 8 illustrates a detection line that intersects a number of reconstruction cells.

As an example, FIG. 8 illustrates a detection line $D_i$ that intersects a set of cells j50, j51, j70, j71. It is realized that $P_{i,j51}$ will be larger than $P_{i,j70}$ which in turn will be larger than $P_{i,j71}$. $P_{i,j50}$ may have a small value if the detection line $D_i$ is considered to have width that extends into the cell j50.

Step 74 may thus be configured to access the memory 14 to retrieve a set of interaction strengths for the selected cell and normalize each attenuation value by its corresponding interaction strength. To avoid a division, the interaction strengths may be stored as $1/P_{i,j}$ in the memory 14.

FIGS. 9A-9C illustrate the interaction strengths of cells j1, j2 and j3, respectively, where each Figure indicates the interaction strengths that correspond to the attenuation values in FIGS. 5A-5C. FIGS. 10A-10C illustrate the corresponding normalized attenuation values sorted by magnitude. By comparing FIGS. 10A-10C with FIGS. 6A-6C, it is seen that the normalization results in a reduced variability among the attenuation values, which may facilitate or improve the analysis in step 75.

In another variation, the method in FIG. 7 is combined with an image reconstruction process that operates on at least part of the attenuation values (or corresponding values in any other format) to generate a 2D map of reconstruction values (e.g. attenuation values) for the entire touch surface or a part of touch surface. Any available algorithm for image reconstruction may be used, including tomographic methods such as Filtered Back Projection, FFT-based algorithms, ART (Algebraic Reconstruction Technique), SART (Simultaneous Algebraic Reconstruction Technique), etc. Alternatively, the image reconstruction processing may generate the 2D map by adapting one or more basis functions and/or by statistical methods such as Bayesian inversion. Examples of image reconstruction techniques designed for use in touch systems are found in WO2010/006883, WO2009/077962, WO2011/049511, WO2011/139213, WO2012/050510, and PCT/SE2012/051142 filed on Oct. 24, 2012, all of which are incorporated herein by reference. Conventional image reconstruction techniques are found in the mathematical literature, e.g. "The Mathematics of Computerized Tomography" by Natterer, and "Principles of Computerized Tomographic Imaging" by Kak and Slaney.

The inventive touch detection may be combined with the use of such a 2D map in several different ways to achieve additional advantages. Below, three main embodiments that combine 2D map analysis with the touch detection technique of FIG. 7 are presented.

In a first main embodiment, the 2D map may be processed for identification of peaks that may correspond to a touch, and the regions of these peaks may be input as a respective ROI in step 72. Thereby, the inventive touch detection may be operated to validate the cell(s) in each ROI for presence or absence of one or more touches.

Figure 11:
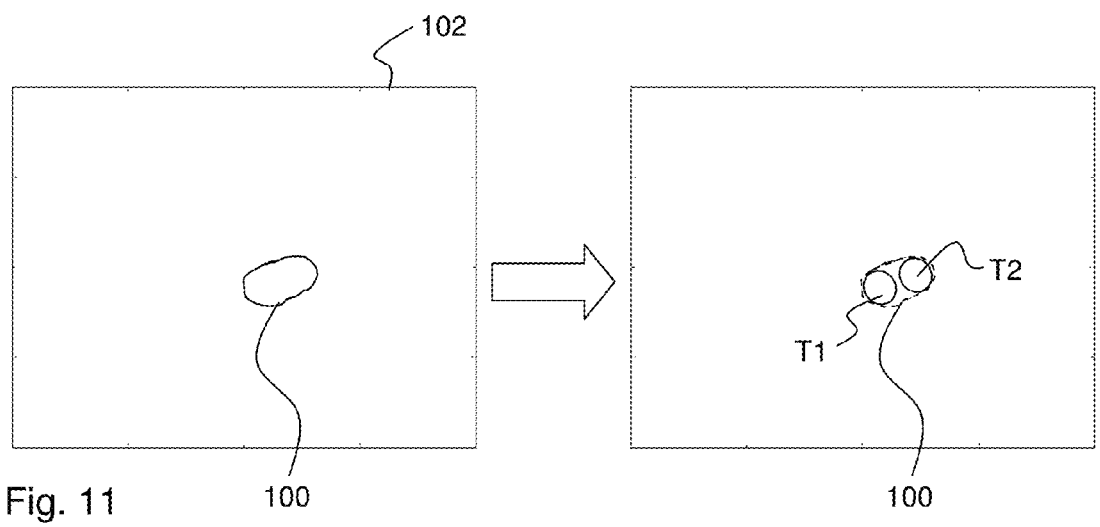
FIG. 11 illustrates use of the method in FIG. 7 for validating a region in a 2D map obtained by conventional image reconstruction processing.

In one specific example of the first main embodiment, illustrated in FIG. 11, steps 72-76 are executed to check if an exceptionally large or irregularly shaped peak 100 in a 2D map 102 corresponds to one or more touches T1, T2. Thus, the inventive touch detection may be applied to locally improve the resolution of the 2D map 102 with respect to the location and extent of touches.

Figure 12:
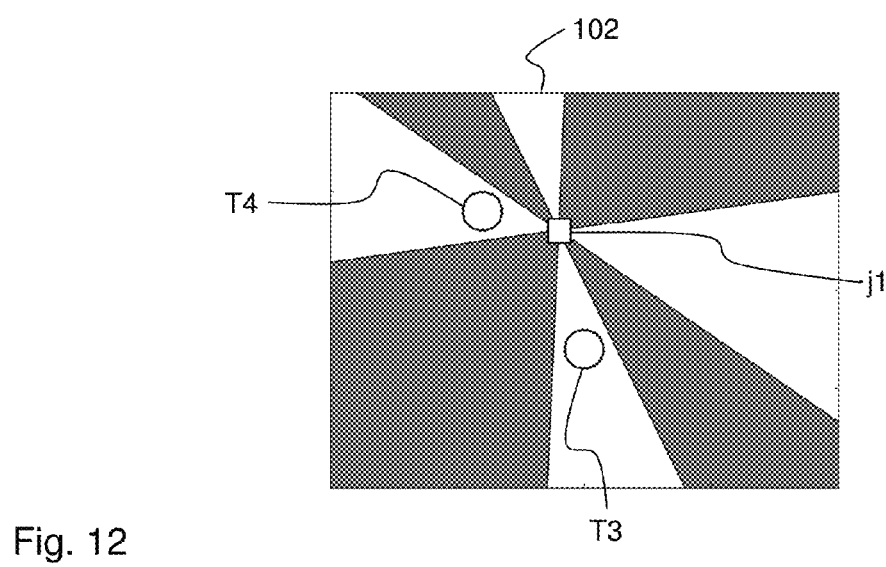
FIG. 12 illustrates a technique for selecting a subset of detection lines based on the location of other touches.

In a second main embodiment, the 2D map may be processed for identification of peaks (ROIs) that may correspond to a touch, and the analysis step 75 may be adapted to exclude from the analysis the intersecting detection lines that are deemed affected by the peaks (ROIs). Thus, for each selected cell, only the attenuation values of intersecting detection lines that do not pass through the peaks are analyzed in step 75. This is further illustrated in FIG. 12, which schematically illustrates a 2D 102 map containing two positive peaks T3, T4. When the reconstruction cell j1 in FIG. 12 is processed by steps 74-75, the attenuation values belonging to the white regions may be excluded from the analysis, since they are known to pass through peaks T3, T4. By excluding these attenuation values, it is possible to detect presence of a weaker touch in the reconstruction cell, even if it is not detectable in the 2D map 102. This approach of excluding attenuation values may also be used for validating (verifying) a weak touch which is detected in the 2D map 102. In a variant of the second main embodiment, the analysis step 75 may be adapted to exclude from the analysis only the intersecting detection lines that are deemed affected by strong peaks, e.g. peaks that exceed a given threshold.

Figure 13:
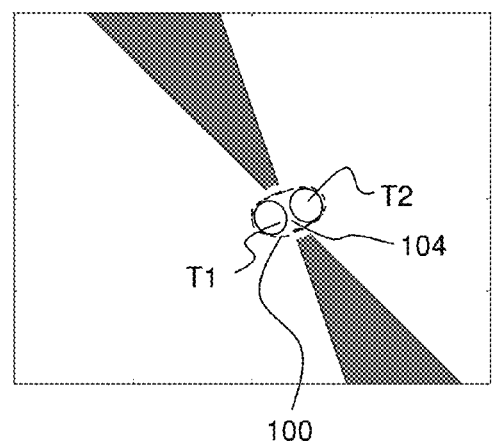
FIG. 13 illustrates use of the technique in FIG. 12 for validating a gap between touches.

The second main embodiment may be used in combination with the first main embodiment to further improve the validation of cell(s) in an ROI. Returning to FIG. 11, a first pass of steps 72-76 may be performed according to the first main embodiment to validate the cells within the peak 100. If the first pass results in cells deemed not to include a touch, e.g. the cells in the gap region 104 between the touches T1, T2, as shown in FIG. 13, these cells may be further validated in a second pass of steps 72-76 using the second main embodiment and with the ROI set to the gap region 104 (or part thereof). In the second pass, step 75 excludes the intersecting detection lines that are deemed affected by the touches T1 and T2. For example, step 75 may be operated only on detection lines belonging to the dark regions in FIG. 13. This may improve the reliability of the determined touch status for each cell within the peak 100.

In a third main embodiment, the 2D map is used for setting the range $\Delta\alpha$ used in the analysis in step 75. In a first implementation, if a peak in the 2D map is to be validated by steps 72-76, the range $\Delta\alpha$ may be set differently if the peak is positive or negative. If the peak is positive, the range $\Delta\alpha$ may be set to include all negative attenuation values, whereby all negative attenuation values are excluded from the count of attenuated detection lines ($N_a$). Conversely, if the peak is negative, the range $\Delta\alpha$ may be set to include all positive attenuation values.

In a second implementation of the third main embodiment, an attenuation value is determined for the selected reconstruction cell or the peak based on the 2D map, and the range $\Delta\alpha$ is set based on this attenuation value. This implementation may be further explained with reference to FIG. 11. The validation of the peak 100 may be made more robust by setting the upper limit of the range $\Delta\alpha$ to a given fraction, e.g. 20%, of the peak attenuation value (if positive). Such an approach may enable detection of the gap region even if none of the intersecting detection lines in the gap region are fully unaffected by touches but rather exhibit a reduced attenuation compared to the cells covered by the touches T1, T2. Generally, the second implementation allows the range $\Delta\alpha$ to be automatically expanded close to strong touches and reduced close to weak touches.

It is to be understood that the first, second and third main embodiments may be used in any combination, either in sequence or in parallel, to improve the touch detection. Further, the first, second and third main embodiments may also be applied to validate regions that are deemed to contain reconstructions errors, e.g. to search for weak touches that may be hidden in the reconstruction errors.

As an alternative or supplement to detecting peaks in a 2D map generated by image reconstruction processing, the location of touches in the current frame may be estimated by prediction based on their location in a number of preceding frames. In a further alternative or supplement, the location of peaks or regions of interest in the current frame may be estimated by identifying candidate areas according to WO2011/049513, which is incorporated herein by reference.

In a further combination, the inventive technique is operated to generate a touch status for all cells within an ROI, whereupon the touch status is processed for identification of one or more regions ("reconstruction region") to be reconstructed by image reconstruction processing. For example, reconstruction errors may be avoided if the reconstruction region is selected to exclude the strongest touches that are indicated by the touch status.

5. Hardware Implementations

Figure 14:
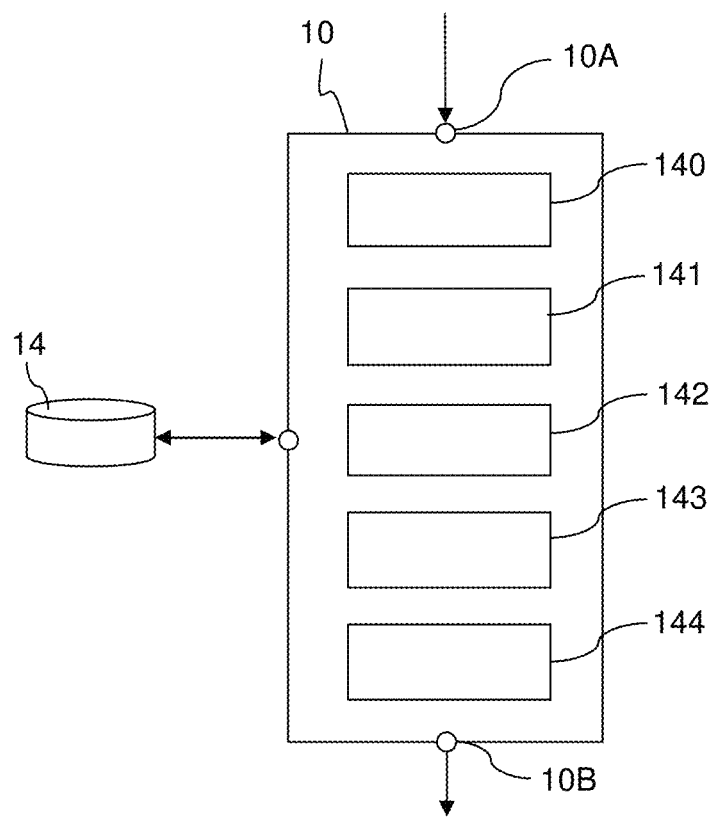
FIG. 14 is a block diagram of a device that implements the method of FIG. 7.

The touch detection according to the various embodiments disclosed herein may be implemented by a data processing device (cf. 10 in FIGS. 1-2) which is connected to sample measurement values from the sensors 3 in the touch-sensitive apparatus. FIG. 14 shows an example of a data processing device 10 configured to implement the process in FIG. 7. The device 10 includes an input 10A for receiving the output signal. The device 10 further includes a cell definition element (or means) 140 for defining the grid of reconstruction cells on the touch surface, a data collection element (or means) 141 for obtaining the current projection values, a conversion element (or means) 142 for generating attenuation values, an ROI element (or means) 143 for identifying the region of interest, and a validation element (or means) 144 for repeatedly evaluating the touch status of selected cells in the region of interest according to steps 74 and 75 in FIG. 7, and an output 10B for outputting the touch status.

The device 10 may be implemented by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit may serve as one element/means when executing one instruction, but serve as another element/means when executing another instruction. In addition, one element/means may be implemented by one instruction in some cases, but by a plurality of instructions in some other cases. Naturally, it is conceivable that one or more elements (means) are implemented entirely by analog hardware components.

The software controlled device 10 may include one or more processing units (cf. 14 in FIG. 1), e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The device 10 may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software, reference values (REF), region of interest data (ROI), mapping of cells to detection lines (MAP), and any other data needed during execution, may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The data processing device 10 may include one or more communication interfaces, such as a serial interface, a parallel interface, a USB interface, a wireless interface, a network adapter, etc, as well as one or more data acquisition devices, such as an A/D converter. The special-purpose software may be provided to the device 10 on any suitable computer-readable medium, including a record medium, and a read-only memory.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and the scope of the appended claims.

For example, the attenuation values need not strictly represent attenuation for the individual detection lines, but could be "interaction values" that represent interaction in a broad sense. With respect to the specific formats of the attenuation values at presented in the foregoing description, modifications may be made, e.g., to sign, scaling or offset. In other variants, the interaction values may be generated as a transmission (e.g. given by the projection value normalized by the reference value), an energy difference (e.g. given by the difference between the projection value and the reference value), or a logarithm of the energy difference. It may even be possible to use the projection values as interaction values. It is also conceivable to generate the interaction values by subjecting the projection signals to digital filtering. For example, interaction values representing short-term changes (corresponding to interaction changes during the above-mentioned time interval $\Delta t$) may be generated by applying a high-pass filter on the individual projection signals.

The skilled person can readily adapt the teachings herein to such alternative interaction values, for example by using another value than zero to represent absence of interaction.

It is also to be noted that the inventive detection may not only be used to detect touches, which correspond to actively controlled objects on the touch surface, but also to detect the location of contamination or changes in contamination on the touch surface.

The invention claimed is:

1. A method for detecting objects on a panel having a touch surface, said method comprising:
defining a plurality of reconstruction cells with respect to the touch surface, each of the plurality of reconstruction cells corresponding to a region on the touch surface, the region being intersected by a respective set of signal transmission paths, the signal transmission paths defined by signals transmitted across the touch surface from a plurality of emitters to a plurality of detectors, and the signal transmission paths extending across the touch surface of the panel between pairs of the plurality of emitters and the plurality of detectors;
obtaining an output signal based on a signal property measurement for each signal transmission path;
processing the output signal to obtain an interaction value for each signal transmission path; and
determining a touch status of a selected reconstruction cell among the plurality of reconstruction cells by analyzing a distribution of interaction values for signal transmission paths intersecting the region on the touch surface corresponding to the selected reconstruction cell, the touch status indicating presence or absence of at least one of the objects in the region corresponding to the selected reconstruction cell;
wherein the determining a touch status includes
identifying, based on the interaction values, at least one of interacting and non-interacting signal transmission paths among the signal transmission paths intersecting the region corresponding to the selected reconstruction cell; and
determining the touch status based on a ratio given by a count of said at least one of interacting and non-interacting signal transmission paths.

2. The method of claim 1, wherein the analyzing a distribution of interaction values comprises:
analyzing the distribution of interaction values in relation to an interaction value representing either absence or presence of interaction with an object along the respective transmission path.

3. The method of claim 2, wherein the touch status is determined by a degree of clustering of interaction values at the interaction value.

4. The method of claim 1, wherein the interacting and non-interacting signal transmission paths are deemed to intersect and not intersect, respectively, one or more of the objects on the touch surface.

5. The method of claim 1, wherein the ratio relates the count to a number of signal transmission paths intersecting the region corresponding to the selected reconstruction cell.

6. The method of claim 1, wherein the identifying at least one of interacting and non-interacting signal transmission paths comprises:
mapping the interaction values for the signal transmission paths intersecting the region corresponding to the selected reconstruction cell to a specific range of interaction values.

7. The method of claim 6, wherein the specific range includes an interaction value representing either presence or absence of interaction with an object along the respective signal transmission path.

8. The method of claim 1, wherein the identifying at least one of interacting and non-interacting signal transmission paths comprises:
processing the interaction values for detection of one or more clusters of interaction values of corresponding magnitude; and
determining said count based on said one or more clusters.

9. The method of claim 8, wherein said count is given by a count of interaction values in a cluster including an interaction value representing either presence or absence of interaction with an object along the respective signal transmission path.

10. The method of claim 1, further comprising:
normalizing, before the determining a touch status, the interaction values for the set of signal transmission paths intersecting the region corresponding to the selected reconstruction cell, by a respective intersection value corresponding to a relative overlap between the respective signal transmission path and the region corresponding to the selected reconstruction cell.

11. The method of claim 1, wherein the determining a touch status is performed for a plurality of selected reconstruction cells corresponding to a region of interest on the touch surface.

12. The method of claim 11, further comprising:
generating a two-dimensional distribution of reconstruction values representative of interaction on the touch surface by operating an image reconstruction algorithm on the interaction values for at least part of the signal transmission paths; and
processing the two-dimensional distribution to identify said region of interest.

13. The method of claim 12, wherein said region of interest is identified in the two-dimensional distribution to contain the at least one of the objects.

14. The method of claim 12, wherein the region of interest is a coherent region of reconstruction values indicating presence of the at least one of the objects.

15. The method of claim 12, further comprising:
determining a peak reconstruction value within the region of interest in the two-dimensional distribution; and
setting specific range of interaction values in relation to the peak reconstruction value.

16. A method for detecting objects on a panel having a touch surface, said method comprising:
defining a plurality of reconstruction cells with respect to the touch surface, each of the plurality of reconstruction cells corresponding to a region on the touch surface, the region being intersected by a respective set of signal transmission paths, the signal transmission paths defined by signals transmitted across the touch surface from a plurality of emitters to a plurality of detectors, and the signal transmission paths extending across the touch surface of the panel between pairs of the plurality of emitters and the plurality of detectors;
obtaining an output signal based on a signal property measurement for each signal transmission path;
processing the output signal to obtain an interaction value for each signal transmission path;
determining a touch status of a selected reconstruction cell among the plurality of reconstruction cells by analyzing a distribution of interaction values for signal transmission paths intersecting the region on the touch surface corresponding to the selected reconstruction cell, the touch status indicating presence or absence of at least one of the objects in the region corresponding to the selected reconstruction cell, wherein the determining a touch status is performed for a plurality of selected reconstruction cells corresponding to a region of interest on the touch surface;
generating a two-dimensional distribution of reconstruction values representative of interaction on the touch surface by operating an image reconstruction algorithm on the interaction values for at least part of the signal transmission paths;
processing the two-dimensional distribution to identify said region of interest;
estimating a location of the objects on the touch surface; and
selecting, based on the estimated location of the objects and for the selected reconstruction cell, a subset of the set of signal transmission paths intersecting the region corresponding to the selected reconstruction cell, the subset being selected to exclude the signal transmission paths that geometrically intersect the estimated location of at least one of the objects; wherein
the touch status is determined by analyzing the distribution of interaction values for the subset of signal transmission paths.

17. A device for detecting objects on a panel having a touch surface, said device comprising:
at least one processor configured to execute computer readable instructions to
define a plurality of reconstruction cells with respect to the touch surface, each of the plurality of reconstruction cells corresponding to a region on the touch surface, the region being intersected by a respective set of signal transmission paths, the signal transmission paths defined by signals transmitted across the touch surface from a plurality of emitters to a plurality of detectors, and the signal transmission paths extending across the touch surface of the panel between pairs of the plurality of emitters and the plurality of detectors;
obtain an output signal from a signal detection arrangement configured to measure a signal property for each signal transmission path;
process the output signal to obtain an interaction value for each signal transmission path; and
determine a touch status of a selected reconstruction cell among the plurality of reconstruction cells by analyzing a distribution of interaction values for signal transmission paths intersecting the region on the touch surface corresponding to the selected reconstruction cell, the touch status indicating presence or absence of at least one of the objects in the region corresponding to the selected reconstruction cell;
wherein the at least one processor is further configured to execute computer readable instructions to determine the touch status by
identifying, based on the interaction values, at least one of interacting and non-interacting signal transmission paths among the signal transmission paths intersecting the region corresponding to the selected reconstruction cell, and
determining the touch status based on a ratio given by a count of said at least one of interacting and non-interacting signal transmission paths.

18. A touch-sensitive apparatus, comprising:
a panel;
a plurality of emitters and a plurality of detectors, the plurality of emitters configured to transmit signals to the plurality of detectors, thereby defining signal transmission paths extending across a touch surface of the panel between pairs of the plurality of emitters and the plurality of detectors;
a signal generator configured to generate the signals at the plurality of emitters;
a signal detection arrangement for generating an output signal based on detected signals at the plurality of detectors; and
the device for detecting objects according to claim 17.

* * * * *